US008429401B2

(12) United States Patent
Legg

(10) Patent No.: US 8,429,401 B2
(45) Date of Patent: Apr. 23, 2013

(54) METHOD AND APPARATUS FOR VIRTUALLY ERASING DATA FROM WORM STORAGE DEVICES

(75) Inventor: Stephen P. Legg, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 11/271,609

(22) Filed: Nov. 9, 2005

(65) Prior Publication Data

US 2006/0282669 A1   Dec. 14, 2006

(30) Foreign Application Priority Data

Jun. 11, 2005 (EP) .................................. 0511919

(51) Int. Cl.
*H04L 29/06* (2006.01)
*G06F 21/00* (2006.01)
(52) U.S. Cl.
USPC ........... 713/164; 713/165; 713/166; 713/167; 713/193
(58) Field of Classification Search .......... 713/164–167, 713/193
See application file for complete search history.

(56) References Cited

U.S. PATENT DOCUMENTS

| 6,067,545 | A | * | 5/2000 | Wolff ...................................... 1/1 |
| 6,075,862 | A | * | 6/2000 | Yoshida et al. .................. 380/28 |
| 6,134,660 | A | | 10/2000 | Boneh et al. |
| 6,351,813 | B1 | | 2/2002 | Mooney et al. |
| 6,473,861 | B1 | * | 10/2002 | Stokes ........................... 713/193 |
| 6,507,541 | B1 | * | 1/2003 | Suzuki et al. .............. 369/30.09 |
| 6,640,225 | B1 | * | 10/2003 | Takishita et al. ................... 707/5 |
| 6,804,781 | B1 | | 10/2004 | Castro |
| 6,832,731 | B2 | * | 12/2004 | Kaneko ........................... 235/492 |
| 6,928,551 | B1 | * | 8/2005 | Lee et al. ....................... 713/165 |
| 6,940,683 | B2 | * | 9/2005 | Berman et al. ............. 360/77.12 |
| 7,007,170 | B2 | * | 2/2006 | Morten .......................... 713/193 |
| 7,162,602 | B2 | * | 1/2007 | Kodama ........................ 711/163 |

(Continued)

FOREIGN PATENT DOCUMENTS

| JP | 2003187524 A | 7/2003 |
| JP | 2003523016 A | 7/2003 |

(Continued)

OTHER PUBLICATIONS

Yongge Wang and Yuliang Zheng; "Fast and Secure Magnetic WORM Storage Systems"; Department of Software and Information Systems University of North Carolina at Charlotte; Sep. 7, 2004; pp. 1-14.*

(Continued)

*Primary Examiner* — Catherine Thiaw
(74) *Attorney, Agent, or Firm* — Griffiths & Seaton PLLC

(57) ABSTRACT

A storage device capable of selectively rendering certain data irretrievable is disclosed. The storage device includes Write Once Read Many (WORM) storage medium, a key generator, an encrypted write component, an erasable storage medium and a key deleter. The WORM storage medium is capable of storing data, and the data stored in the WORM data storage medium are unerasable and unrewritable. The key generator provides a generated key that can be stored in the erasable storage medium. The encrypted write component writes a set of sensitive data encrypted by using the generated key to the WORM storage medium. In response to a request for deleting the set of sensitive data from the WORM storage medium, the key deleter deletes the generated key from the erasable storage medium.

12 Claims, 2 Drawing Sheets

U.S. PATENT DOCUMENTS

| | | | | |
|---|---|---|---|---|
| 7,216,207 | B1 * | 5/2007 | Armstrong-Crews et al. | 711/159 |
| 7,272,727 | B2 * | 9/2007 | Mimatsu | 713/193 |
| 7,303,135 | B2 * | 12/2007 | Nakabe et al. | 235/492 |
| 7,333,616 | B1 * | 2/2008 | Brettle et al. | 380/277 |
| 7,373,668 | B1 * | 5/2008 | Trimberger | 726/26 |
| 7,376,062 | B2 * | 5/2008 | Hsu et al. | 369/53.24 |
| 7,441,075 | B2 * | 10/2008 | Evans et al. | 711/111 |
| 7,502,946 | B2 * | 3/2009 | Perkins et al. | 713/193 |
| 7,593,532 | B2 * | 9/2009 | Plotkin et al. | 380/284 |
| 7,885,895 | B2 * | 2/2011 | Asano | 705/57 |
| 8,024,572 | B2 * | 9/2011 | Vandermolen | 713/178 |
| 2003/0085289 | A1 * | 5/2003 | Kaneko | 235/492 |
| 2005/0216534 | A1 * | 9/2005 | Ikezawa et al. | 707/204 |
| 2005/0275965 | A1 * | 12/2005 | Herring et al. | 360/92 |
| 2006/0015752 | A1 * | 1/2006 | Krueger | 713/193 |
| 2008/0008090 | A1 * | 1/2008 | Gilfix | 370/230 |

FOREIGN PATENT DOCUMENTS

| | | |
|---|---|---|
| JP | 2004280551 A | 10/2004 |
| JP | 2004296006 A | 10/2004 |
| WO | WO 01/59617 | 8/2001 |

OTHER PUBLICATIONS

IBM Publication, "IBM TotalStorage Tape Selection and Differentiation Guide", May 27, 2004 retrieved from: https://www.e-techservices.com/public/redbooks/TapeSelection+DifferentationGuide.pdf.*

* cited by examiner

METHOD AND APPARATUS FOR VIRTUALLY ERASING DATA FROM WORM STORAGE DEVICES

RELATED PATENT APPLICATION

The present patent application claims priority to a European Application No. 05119193, filed on Jun. 11, 2005.

BACKGROUND OF THE INVENTION

1. Technical Field

The present invention relates to data storage in general, and in particular to Write Once Read Many (WORM) storage devices. Still more particularly, the present invention relates to a method and apparatus for selectively erasing data from a WORM storage device.

2. Description of Related Art

Many commercial organizations are required to have data retention policies, and the length of a retention period depends on the type of data and the associated business. For example, equities trading companies are required to retain all traders' e-mails and instant messages for approximately five to seven years. In addition, the retention method must be of the Write Once Read Many (WORM) type, as commonly required by most governing bodies. With a WORM storage medium, a record cannot be modified or tampered with after the record was written. CD-ROM is one type of well-known WORM storage medium.

While it is required to retain certain data for the statutory period, it is also highly desirable to ensure that such data are destroyed after such period has been expired. Thus, at the expiration of a data retention period, the conventional practice is to physically destroy the WORM storage medium because the continued retention of the data would represent a potential liability otherwise.

The conventional practice would not pose any problem if the retention period of all data on a WORM storage medium expired at the same time because the entire WORM storage medium could simply be destroyed. However, with a typical storage medium, such as a tape cartridge, it is most likely that some files recorded on the WORM storage medium may have passed their expiration date while others may not have. In addition, if there is an ongoing investigation, some records are required to be retained for a longer period. Such situation of having records that needed to be obliterated and records that needed to be retained on the same WORM storage medium is very undesirable. The nature of a WORM storage medium being that it is "tamper proof," it is not acceptable simply to copy the data that needed to be retained onto another storage medium because the original certifiable record must be retained also.

One possible solution for alleviating the above-mentioned problem would be to store fewer records on each WORM storage medium in order to limit the exposure of collocated data artificially extending the life of expired data. However, such solution is undesirable in terms of cost and storage space, not to mention it runs counter to the continuing trend of larger and larger storage capacities in a single WORM storage medium.

Consequently, it would be desirable to provide an improved method for selectively erasing data from a WORM storage medium.

SUMMARY OF THE INVENTION

In accordance with a preferred embodiment of the present invention, a storage device includes Write Once Read Many (WORM) storage medium, a key generator, an encrypted write component, an erasable storage medium and a key deleter. The WORM storage medium is capable of storing data, and the data stored in the WORM data storage medium are unerasable and unrewritable. The key generator provides a generated key that can be stored in the erasable storage medium. The encrypted write component writes a set of sensitive data encrypted by using the generated key to the WORM storage medium. In response to a request for deleting the set of sensitive data from the WORM storage medium, the key deleter deletes the generated key from the erasable storage medium.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The intent of most data erasing schemes that overwrite data with various patterns is to reduce the signal-to-noise ratio of the recorded information until it is below some threshold of recoverability. Depending on the degree of concern and the sensitivity of data, more overwrites may be used with different patterns to maximize the likelihood of changing the state of each bit on a storage medium several times. Such data erasing schemes provide sufficient erasure for the most commercially sensitive data. However, for data with a top secret classification, only physical destruction of the storage medium containing the data is considered as sufficient.

In accordance with a preferred embodiment of the present invention, an encryption method is utilized to render data in a storage medium unreadable. Once encrypted with a suitably strong scheme, such as encryption technology compliant with the Advanced Encryption Standard (AES) using appropriately long keys, the encrypted text is indistinguishable from noise without the use of a key. This means that the effective signal-to-noise ratio of any given data block encrypted under a given key may be immediately reduced to very close to zero by deliberately destroying the key.

As such, a file or a tape segment recorded on a Write Once Read Many (WORM) storage device may be changed from readable data to undecodable noise by erasing a key that may be stored elsewhere. The important point is that the WORM storage medium itself does not need to be overwritten or tampered with in any way. In fact, the decryption and recoverability of the data using the key is in itself an assurance that there has been no tampering, as with many encryption schemes there is no way to know how to change the encrypted text to make a predetermined change in the plain text without knowing the key.

The present invention is amenable to commercial applications, as key lengths for secure encryption for the exemplary AES are not impractically long, being 128 bits for the standard level of encryption that is acceptable for most commercial applications. A preferred embodiment of the present invention would require:

i. A random key generator to provide a key for a segment (or block) as the segment is starting to be written. Methods for making such a key generator are well-known to those skilled in the art.

ii. An encryption engine in the write data path (either implemented in hardware, or in software by the application that is writing data to a storage medium). Data are only written to the storage medium in encrypted form, and then, the data having been written, the key is stored to the appropriate location in a separate storage device.

iii. An eraser to erase or overwrite any given key from the separate storage device when required under the control of a records management software system.

Figure 1:
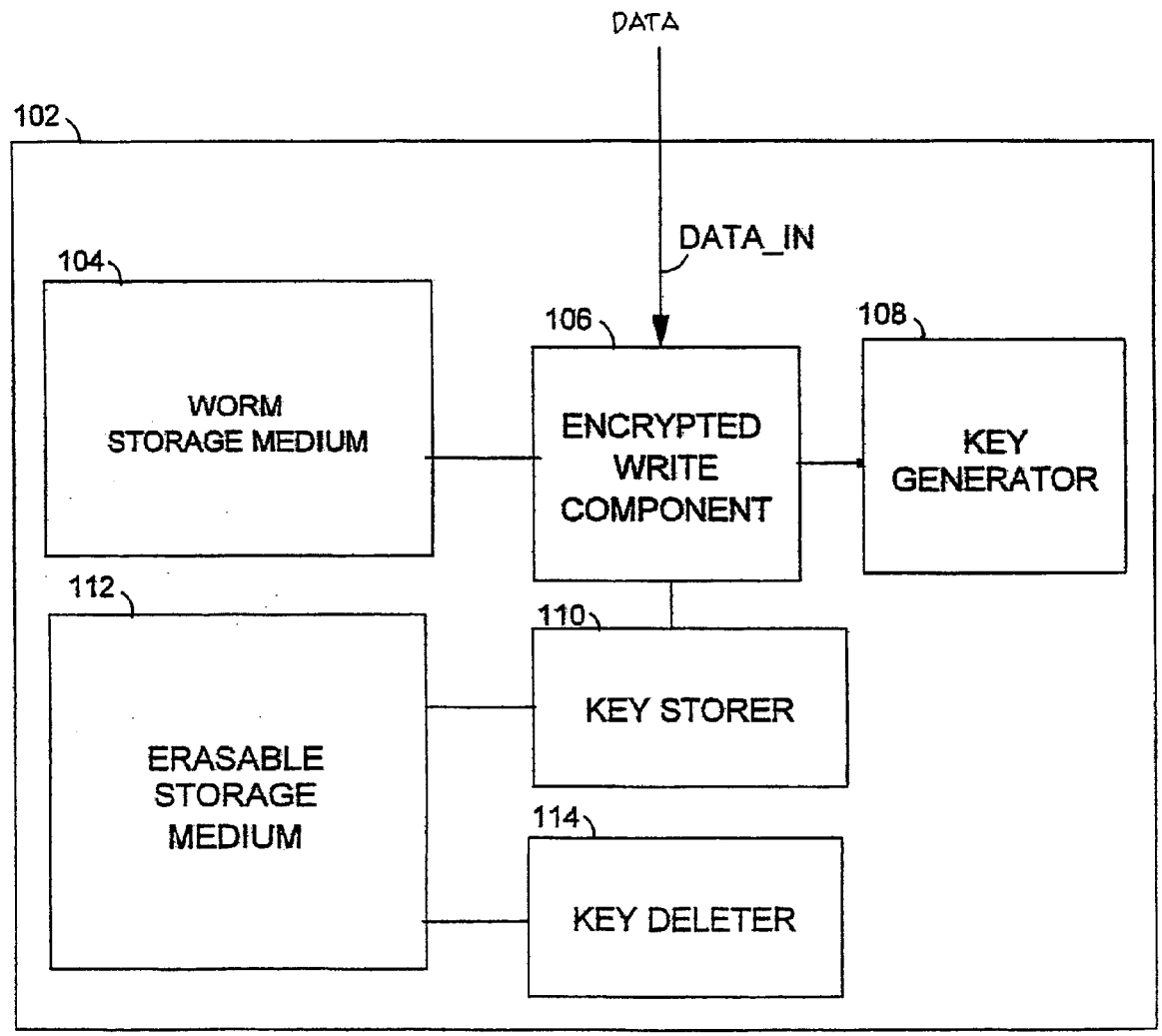
FIG. 1 is a block diagram of a Write Once Read Many (WORM) storage device, in which a preferred embodiment of the present invention can be implemented.

Referring now to the drawings and in particular to FIG. 1, there is depicted a block diagram of a WORM storage device, in which a preferred embodiment of the present invention can be implemented. As shown, a storage apparatus 102 includes a WORM storage medium 104, an erasable storage medium 112, an encrypted write component 106, and a key generator 108. Unencrypted data enter storage apparatus 102 via DATA_IN 101. Key generator 108 provides a generated key, which is used by encrypted write component 106 to encrypt and write the encrypted form of the unencrpyted data to WORM storage medium 104. A key storer 110 is used for placing the generated key in erasable storage medium 112 for storage. When it is desired to render the data computationally infeasible of retrieval (i.e., a "virtual" deletion) from WORM storage medium 104, a key deleter 114 is used to delete the generated key from erasable storage medium 112.

Figure 2:
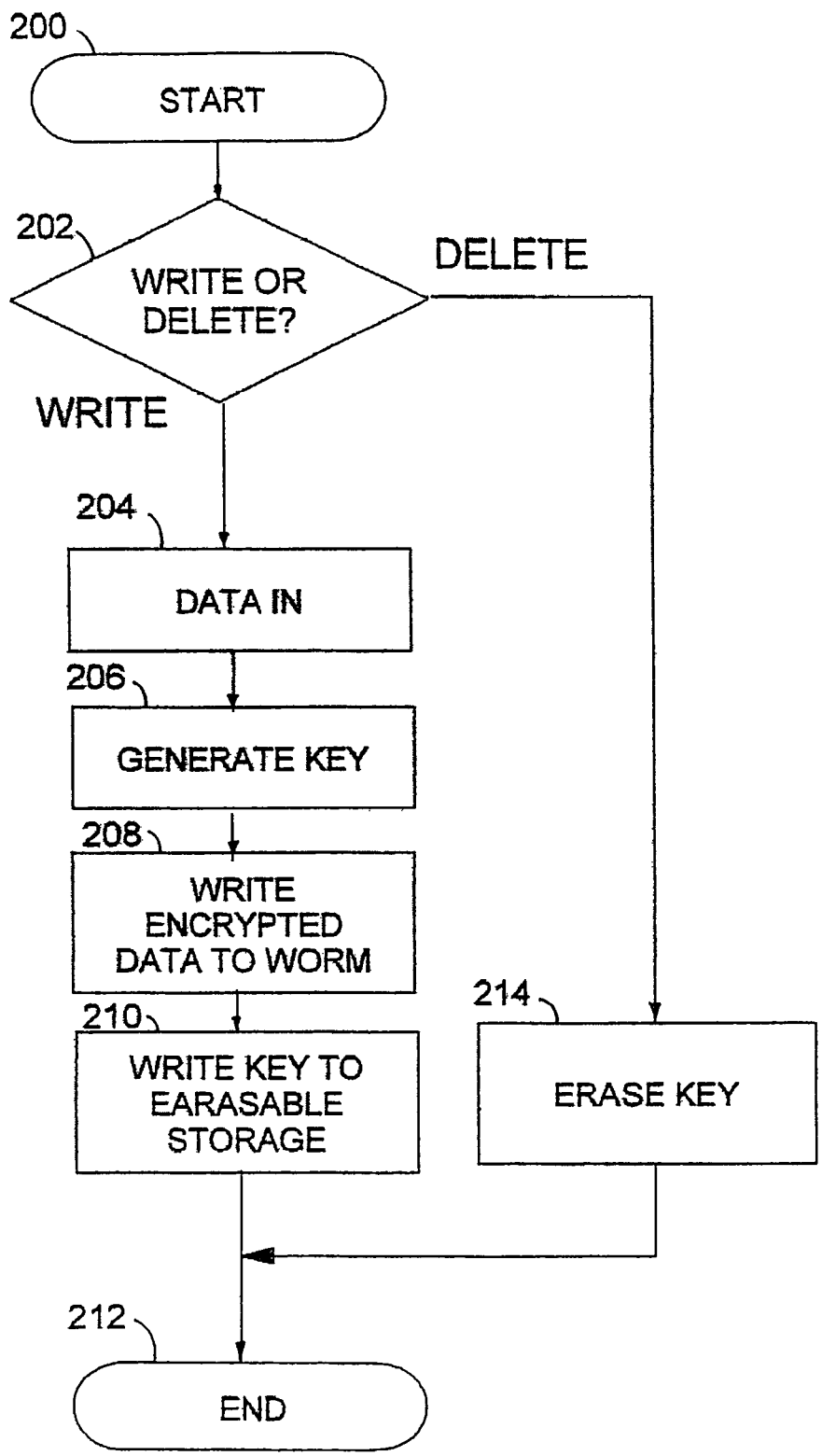
FIG. 2 is a high-level logic flow diagram of a method for virtual erasing data from the WORM storage device from FIG. 1, in accordance with a preferred embodiment of the present invention.

With reference now to FIG. 2, there is depicted a high-level logic flow diagram of a method for virtually erasing data from WORM storage medium 104, in accordance with a preferred embodiment of the present invention. Starting at block 200, a determination is made as to whether data need to be written to WORM storage medium 104 or data need to be deleted from WORM storage medium 104, as shown in block 202. If data need to be written to WORM storage medium 104, data are accepted from DATA_IN 101, as depicted in block 204, and a generated key is provided by key generator 108, as shown in block 206. Encrypted write component 106 uses the generated key to write encrypted data to WORM storage medium 104, as depicted in block 208. The generated key is then placed by key storer 110 in erasable storage medium 112 for storage, as shown in block 208. The process completes at block 212.

Otherwise, if data need to be deleted from WORM storage medium 104, key deleter 114 deletes the generated key, as shown in block 214. This renders the data that were encrypted using the generated key at step 208 computationally infeasible of retrieval, thereby causing it to be "virtually" deleted from WORM storage medium 104. Although the bit pattern for the encrypted data remains on WORM storage medium 104, they cannot be decrypted.

As an example, in the IBM 3592 tape drive, a tape cartridge identifies itself to the tape drive by means of a Radio-Frequency Identification (RFID) chip that is built into the tape cartridge. The RFID chip provides a small amount (currently 4 k byte bits) of non-volatile readable and writable on-chip memory. With key lengths of 128 bits, the RFID chip could provide non-volatile storage for 512 keys associated with, but not actually recorded on the tape. This would mean that the WORM tape itself could be written with 512 distinct segments or files, any of which could be "virtually" obliterated without affecting the neighboring ones, without writing to the tape itself, by deleting the corresponding key from the RFID chip. This improves the granularity of a WORM tape by a factor of 512. A 600 GB tape cartridge that had one segment of, for example, 1 GB on it that needed to be retained, could quite readily have the other 500+ GB of data that was desired to be destroyed rendered irretrievable without compromising the required WORM nature of the data storage medium.

As has been described, the present invention provides a method and apparatus for permitting partial disabling of information retrievability on WORM storage media. Although WORM storage media are utilized to illustrate the present invention, it is understood by those skilled in the art that the present invention is applicable to other types of media as well.

It is also important to note that although the present invention has been described in the context of a fully functional storage system, those skilled in the art will appreciate that the mechanisms of the present invention are capable of being distributed as a program product in a variety of forms, and that the present invention applies equally regardless of the particular type of signal bearing storage media utilized to actually carry out the distribution. Examples of signal bearing storage media include, without limitation, recordable type media such as floppy disks or compact discs.

While the invention has been particularly shown and described with reference to a preferred embodiment, it will be understood by those skilled in the art that various changes in form and detail may be made therein without departing from the spirit and scope of the invention.

What is claimed is:

1. A storage system for selectively rendering certain data irretrievable, said storage system comprising:
   a tape cartridge comprising:
      a Write Once Read Many (WORM) tape for storing an encrypted first set of data including an associated first key and an encrypted second set of data including an associated second key, wherein the first set of data and the second set of data are non-erasable and non-rewritable on the WORM tape, and
      a radio frequency identification (RFID) chip comprising an erasable storage device including a relatively small amount of storage capacity, said RFID chip for identifying said tape cartridge coupled to said WORM tape, said erasable storage device storing said first key and said second key;
   a programmed key generator for generating the first key and generating the second key;
   a programmed encrypted write component coupled to said WORM tape and said programmed key generator, said programmed encrypted write component for writing said encrypted first set of data via said first key to said WORM tape and for writing said encrypted second set of data via said second key to said WORM tape; and
   a programmed key deleter coupled to said RFID chip, said programmed key deleter for deleting said first key from said erasable storage device while maintaining accessibility to said encrypted second set of data on said WORM tape via said second key in response to a request for deleting said encrypted first set of data from said WORM tape, wherein:
      said encrypted first set of data remains written on said WORM tape,
      retrieval of unencrypted data from said encrypted first set of data via said deleted first key is computationally infeasible subsequent to deleting said first key, and retrieval of unencrypted data from said encrypted second set of data on said WORM tape via said second key remains feasible subsequent to deleting said first key.

2. The storage system of claim 1, wherein said programmed encrypted write component uses said first key and said second key with an algorithm having a one way function to write said first set of data and said second set of data.

3. The storage system of claim 1, wherein said programmed encrypted write component uses an Advanced Encryption Standard (AES) algorithm utilizing 128 bits to encrypt said first set of data and said second set of data.

4. The storage system of claim 1, wherein said key generator is configured to randomly generate said first key and said second key.

5. A method for storing data and selectively rendering said data computationally infeasible of retrieval in a tape cartridge comprising a Write Once Read Many (WORM) tape, a radio frequency identification (RFID) chip for identifying said tape cartridge, said RFID chip comprising an erasable storage device including a relatively small amount of storage capacity for storing encryption keys, said tape cartridge configured for coupling to an encryption component, a key generator, a key storer, and a key deleter, said method comprising:
　generating, via said key generator, a first key associated with a first set of data;
　generating, via said key generator, a second key associated with a second set of data;
　using said first key to encrypt and write, via said encryption component, said first set of data to said WORM tape;
　using said second key to encrypt and write, via said encryption component, said second set of data to said WORM tape;
　storing, via said key storer, said first key and said second key in said erasable storage device on said RFID chip; and
　in response to a request for deleting said encrypted first set of data from said WORM tape, deleting, via said key deleter, said first key from said erasable storage device of the RFID chip while maintaining accessibility to said second set of data on said WORM tape via said second key, wherein:
　　said encrypted first set of data remains written on said WORM tape,
　　retrieval of unencrypted data from said encrypted first set of data via said deleted first key is computationally infeasible subsequent to deleting said first key, and
　　retrieval of said encrypted second set of data on said WORM tape via said second key remains feasible subsequent to deleting said first key.

6. The method of claim 5, wherein said method further includes using said first key and said second key with an algorithm having a one way function to write said first set of data and said second set of data.

7. The method of claim 5, wherein said method further includes using an Advanced Encryption Standard (AES) algorithm to write said first set of data and said second set of data.

8. The method of claim 5, wherein:
　generating said first key further comprises randomly generating said first key; and
　generating said second key further comprises randomly generating said second key.

9. A computer-readable memory including a computer program product for storing data and selectively rendering said data computationally infeasible of retrieval in a tape cartridge comprising a Write Once Read Many (WORM) tape and a radio frequency identification (RFID) chip for identifying said tape cartridge, said RFID chip comprising an erasable storage device including a relatively small amount of storage capacity for storing encryption keys, said tape cartridge configured for coupling to an encryption component, a key generator, a key storer, and a key deleter, said computer-readable memory comprising:
　program code configured to generate a first key associated with a first set of data;
　program code configured to generate a second key associated with a second set of data;
　program code configured to use said first key to encrypt and write said first set of data to said WORM tape;
　program code configured to use said second key to encrypt and write said second set of data to said WORM tape;
　program code configured to store said first key and said second key in said erasable storage device on said RFID chip; and
　in response to a request for deleting said first encrypted set of data from said WORM tape, program code configured to delete said first key from said erasable storage device of the RFID chip while maintaining accessibility to said encrypted second set of data on said WORM tape via said second key, wherein:
　　said encrypted first set of data remains written on said WORM tape,
　　retrieval of unencrypted data from said encrypted first set of data via said deleted first key is computationally infeasible subsequent to deleting said first key, and
　　retrieval of said encrypted second set of data on said WORM tape via said second key remains feasible subsequent to deleting said first key.

10. The computer-readable memory of claim 9, wherein said computer-readable memory further includes program code configured to use said first key and said second key with an algorithm having a one way function to write said first set of data and said second set of data.

11. The computer-readable memory of claim 9, wherein said computer-readable memory further includes program code configured to use an Advanced Encryption Standard (AES) algorithm to write said first set of data and said second set of data.

12. The computer-readable memory of claim 9, wherein:
　said computer code configured to generate said first key further comprises computer code configured to randomly generate said first key; and
　said computer code configured to generate said second key further comprises computer code configured to randomly generate said second key.

\* \* \* \* \*